US011192539B2

(12) United States Patent
Hirata et al.

(10) Patent No.: US 11,192,539 B2
(45) Date of Patent: Dec. 7, 2021

(54) VEHICLE CONTROL METHOD AND CONTROL DEVICE

(71) Applicant: Nissan Motor Co., Ltd., Yokohama (JP)

(72) Inventors: Takeshi Hirata, Kanagawa (JP); Yusuke Nakane, Kanagawa (JP); Takanobu Sawada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 80 days.

(21) Appl. No.: 16/652,704

(22) PCT Filed: Oct. 4, 2017

(86) PCT No.: PCT/JP2017/036173
§ 371 (c)(1),
(2) Date: Apr. 1, 2020

(87) PCT Pub. No.: WO2019/069409
PCT Pub. Date: Apr. 11, 2019

(65) Prior Publication Data
US 2020/0238971 A1    Jul. 30, 2020

(51) Int. Cl.
*B60W 20/14* (2016.01)
*B60W 20/12* (2016.01)
(Continued)

(52) U.S. Cl.
CPC ............ *B60W 20/14* (2016.01); *B60W 10/04* (2013.01); *B60W 10/26* (2013.01); *B60W 20/12* (2016.01);
(Continued)

(58) Field of Classification Search
CPC .. B60W 20/14; B60W 20/12; B60W 60/0023; B60W 10/04; B60W 10/26;
(Continued)

(56) References Cited

U.S. PATENT DOCUMENTS

2013/0296124 A1* 11/2013 Pietron .................... B60K 6/26
477/5
2013/0296132 A1* 11/2013 Doering ................ B60W 10/08
477/86

(Continued)

FOREIGN PATENT DOCUMENTS

DE      10 2014 208 758 A1    11/2015
DE       102014208758 A1 *  11/2015    ...... B60W 30/18072
(Continued)

*Primary Examiner* — Jonathan M Dager
*Assistant Examiner* — Jean W Charleston
(74) *Attorney, Agent, or Firm* — Global IP Counselors, LLP

(57) ABSTRACT

A vehicle control method for executing a sailing stop control when a drive source stop condition is established while a vehicle is traveling. The sailing stop control stops a drive source of the vehicle and releases an engaging element provided between the drive source and a drive wheel such that the vehicle travels under inertia. The vehicle control method acquires information on a road on which the vehicle will travel, and then determines whether there is a section on a route where the sailing stop control can be executed based on the information. Upon determining a section exist capable of the sailing stop control, the vehicle control method estimates a power shortage amount, which is a shortage amount of power during sailing stop control, based on the information, and charges a battery with power required to cover the power shortage amount prior to starting the sailing stop control.

8 Claims, 9 Drawing Sheets

(51) Int. Cl.
*B60W 60/00* (2020.01)
*B60W 10/04* (2006.01)
*B60W 10/26* (2006.01)
*B60W 30/18* (2012.01)
*B60W 50/00* (2006.01)

(52) U.S. Cl.
CPC ...... *B60W 30/181* (2013.01); *B60W 60/0023* (2020.02); *B60W 2050/0014* (2013.01); *B60W 2510/244* (2013.01); *B60W 2556/10* (2020.02); *B60W 2556/65* (2020.02)

(58) Field of Classification Search
CPC ........... B60W 30/181; B60W 2556/10; B60W 2556/65; B60W 2050/0014; B60W 2510/244; B60W 50/0097; B60W 2554/406; B60W 2556/50; B60W 2510/1005; B60W 2552/15; B60W 2520/10; B60W 2520/105; B60W 2540/10; B60W 2510/305; B60W 30/18127; B60W 2030/1809; B60W 30/18072; B60W 10/02; B60W 10/06; B60W 10/08; B60W 20/13; Y02T 10/70; Y02T 10/60; Y02T 10/62

USPC .......................................................... 701/22
See application file for complete search history.

(56) References Cited

U.S. PATENT DOCUMENTS

| | | | |
|---|---|---|---|
| 2015/0088349 A1* | 3/2015 | Akashi | B60W 10/08 |
| | | | 701/22 |
| 2017/0088117 A1* | 3/2017 | Ogawa | B60L 7/10 |
| 2017/0240174 A1* | 8/2017 | Sawada | B60W 10/06 |
| 2017/0355358 A1* | 12/2017 | Ogawa | B60W 10/08 |
| 2018/0257654 A1* | 9/2018 | Tashiro | B60W 10/10 |
| 2018/0354368 A1* | 12/2018 | Gotoh | B60W 20/20 |

FOREIGN PATENT DOCUMENTS

| | | | | |
|---|---|---|---|---|
| DE | 10 2014 220 712 A1 | | 4/2016 | |
| DE | 102014220712 A1 * | | 4/2016 | ...... B60W 30/18072 |
| JP | 2012-47148 A | | 3/2012 | |
| JP | 2015-58783 A | | 3/2015 | |
| JP | 2015-113075 A | | 6/2015 | |
| JP | 2016-88334 A | | 5/2016 | |
| JP | 2016-179716 A | | 10/2016 | |
| JP | 2017-24569 A | | 2/2017 | |
| JP | 2017-150392 A | | 8/2017 | |

* cited by examiner

VEHICLE CONTROL METHOD AND CONTROL DEVICE

CROSS-REFERENCE TO RELATED APPLICATIONS

This application is a U.S. national stage application of International Application No. PCT/JP2017/036173, filed on Oct. 4, 2017.

BACKGROUND

Technical Field

The present invention relates to vehicle control in which, when a preset drive source stop condition is established while a vehicle is traveling, a sailing stop control is executed. In sailing stop control, a drive source is stopped and a forward engaging element provided between the drive source and an automatic transmission is released.

Background Information

So-called "sailing stop control" is known as a measure to improve fuel efficiency of a vehicle. In sailing stop control, a drive source (an internal combustion engine) is stopped when a predetermined condition is established during travel, and the vehicle travels under inertia. Japanese Laid-Open Patent Application No. 2012-47148 discloses a control in which a sailing stop control is started when a vehicle speed is equal to or greater than a preset lower-limit speed, and restarts the drive source to cause the vehicle to accelerate once the vehicle speed is less than an lower-limit speed to ensure a prolonged time over which the vehicle travels in a speed range between a preset upper limit speed and the lower-limit speed. This control is intended to extend a time during which sailing stop control can be executed, and further improve fuel efficiency.

SUMMARY

In a configuration in which a motor generator is positioned closer to the drive source than the forward engaging element on a powertrain, it is not possible for power to be generated by the motor generator during sailing stop control in which the drive source is stopped. In addition, when a battery charge falls to a predetermined lower-limit value due to electrical power consumption during sailing stop control, it is necessary to interrupt sailing stop control and generate or regenerate power. In other words, since sailing stop control will be interrupted when the battery charge has fallen to the predetermined lower-limit value during sailing stop control, an adequate fuel-efficiency-improving effect might not be obtained even if the control described in the above-mentioned document is performed.

In this regard, it is an object of the present invention to further improve the fuel-efficiency-improving effect achieved through sailing stop control.

According to an embodiment of the present invention, there is provided a vehicle control method in which, when a drive source stop condition is established while a vehicle is traveling, a sailing stop control is executed in which a drive source of the vehicle is stopped, an engaging element provided between the drive source and drive wheels is released, and the vehicle travels under inertia. In this control method, information on a status of a road on which a host vehicle is to travel is acquired, and a determination is made based on the information as to whether there is a section on a route where the sailing stop control can be executed. When the section where the sailing stop control can be executed is present, a power shortage amount, which is a shortage in an amount of power during sailing stop control, is estimated based on the information, and a battery is charged with power required to cover the power shortage prior to starting the sailing stop control.

DETAILED DESCRIPTION OF THE EMBODIMENTS

An embodiment of the present invention is described below with reference to the accompanying drawings.

Figure 1:
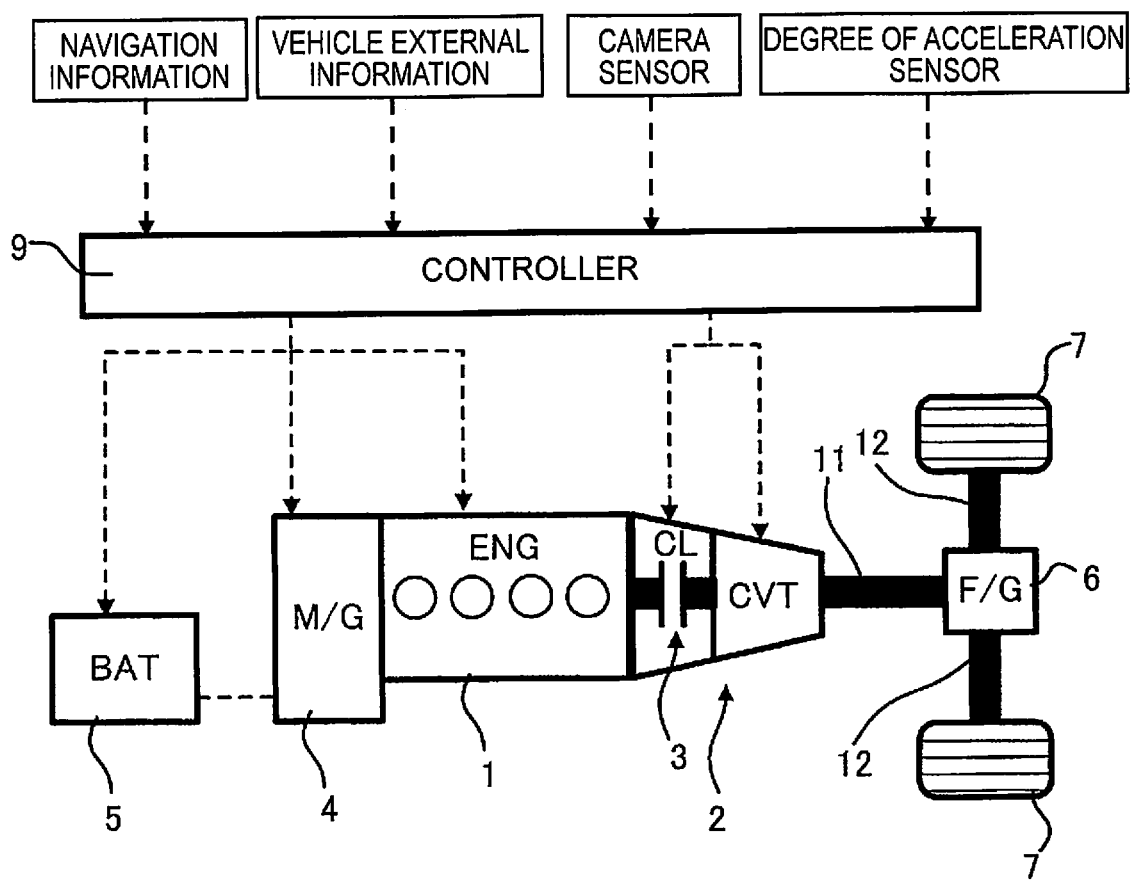
FIG. 1 is a block diagram of a system of a vehicle.

FIG. 1 is a structural diagram of a system of a vehicle according to the present embodiment. The vehicle comprises an engine 1 that serves as a drive source, an automatic transmission 2, a motor generator ("MG") 4, a battery 5, a final gear device 6, a pair of drive wheels 7, and a controller 9.

The engine 1 is an internal combustion engine in which gasoline or light oil is used as a fuel. Engine speed, torque, etc., are controlled based on commands from the controller 9.

The automatic transmission 2 is a continuously variable transmission in the present embodiment, and comprises a clutch 3 serving as a forward engaging element. The clutch 3 is arranged between a transmission mechanism of the continuously variable transmission and the engine 1. When the clutch 3 is to engage, rotation torque of the engine 1 is transmitted to the drive wheels 7 via the automatic transmission 2, a propeller shaft 11, the final gear device 6, and a pair of drive shafts 12. Shift control, and disengagement control of the forward engaging element is performed by the controller 9.

The MG 4 is a synchronous dynamo-electric machine that is connected to an output shaft of the engine 1 via a transmission mechanism (not shown) comprising belts and pulleys. The MG 4 functions as a power generator upon receiving rotational energy from the engine 1, and the generated electrical power charges the battery 5. In addition, the MG 4 can function as a power generator when the engine 1 co-rotates with the drive wheels 7. In other words, kinetic energy of the vehicle can be regenerated as electrical power by the MG 4. It is also possible to drive the MG 4 using electrical power from the battery 5, and perform torque assist for the engine 1 using the torque of the MG 4.

The controller 9 receives, as inputs, information from an onboard navigation system (navigation information), outside information acquired through vehicle-to-vehicle communication or road-to-vehicle communication, information from an onboard camera, and detection signals from acceleration sensors. The controller 9 also receives, as inputs, signals from a crank angle sensor that detects engine speed, an accelerator position sensor, a brake sensor that detects the extent to which the brake is depressed, etc. The controller 9 executes a torque control of the engine, a vehicle behavior control, a sailing stop control (described hereunder), etc., based on the signals.

The controller 9 is configured from a microcomputer comprising a central processing unit (CPU), read-only memory (ROM), random access memory (RAM), and an input/output interface (I/O interface). The controller 9 can also be configured from a plurality of microcomputers.

The sailing stop control executed by the controller 49 shall now be described.

In the sailing stop control, when a predetermined sailing stop condition is established during travel, the engine 1 is automatically stopped and the forward clutch 3 becomes disengaged, whereby the vehicle travels under inertia. A state in which a vehicle travels under the sailing stop control shall be referred to as "sailing stop travel" hereunder. The sailing stop control may also be indicated as "SS control" in certain instances.

The sailing stop conditions include, e.g., having the vehicle speed be equal to or greater than a preset lower-limit vehicle speed, having the accelerator pedal and brake pedal not be depressed, and forward range having been selected in the automatic transmission 2. If the vehicle speed range is divided into low speed, middle speed, and high speed, the lower-limit vehicle speed is a middle or high speed, and is set in advance through experiments, etc.

The sailing stop control ends when a sailing stop disengagement condition is established during sailing stop travel. Sailing stop disengagement conditions include having the vehicle speed be less than a lower-limit vehicle speed, the accelerator pedal having been depressed, or the brake pedal having been depressed.

A control in which, while the engine 1 is operated at idle speed, the forward clutch 3 is placed in a state of disengagement and the vehicle travels under inertia is referred to as the sailing idle control, which is distinct from the sailing stop control described above.

Figure 2:
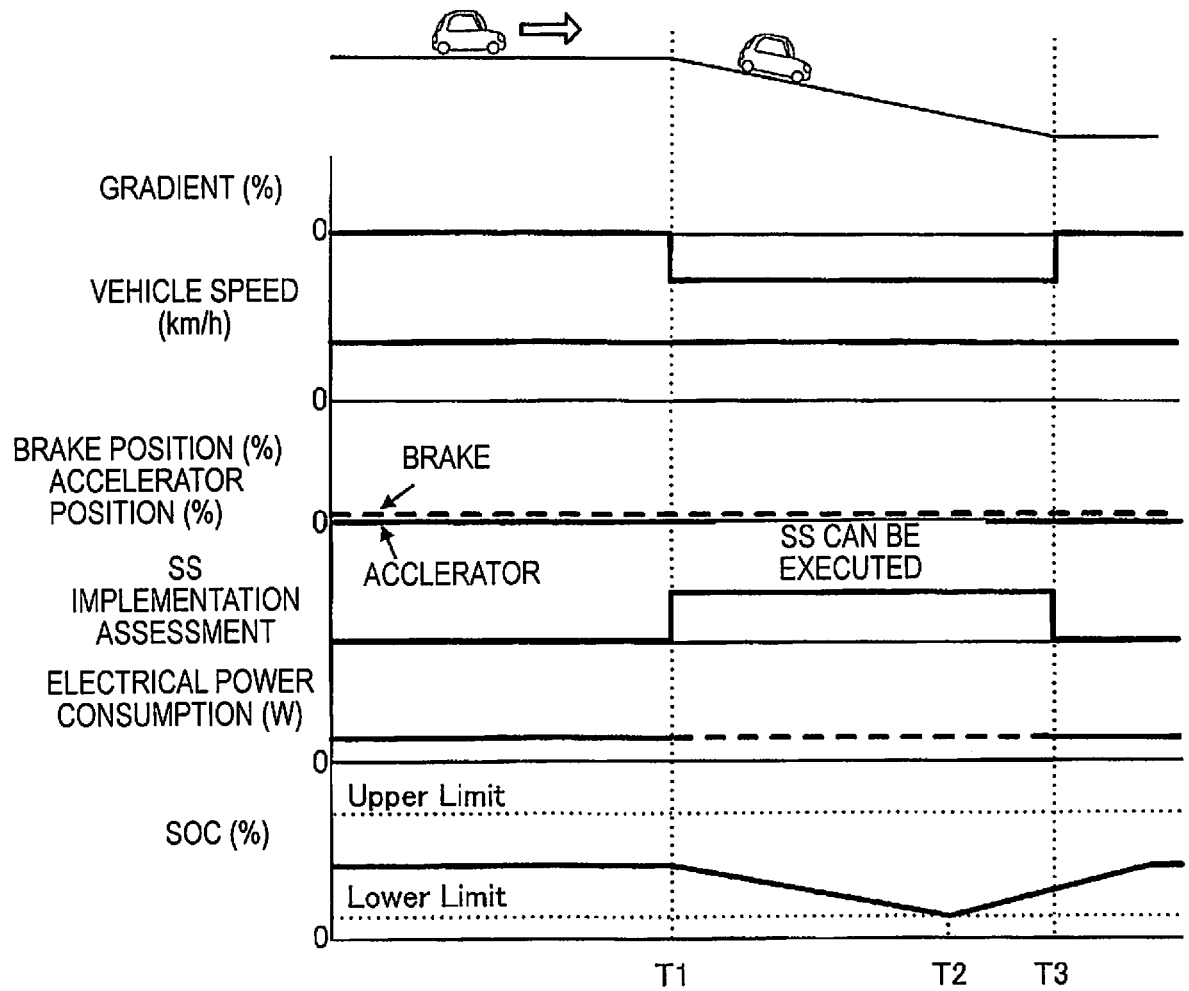
FIG. 2 is a timing chart for illustrating a problem to be overcome by the present invention.

FIG. 2 is a timing chart for illustrating the problem to be solved by the present embodiment.

The sailing stop travel starts at time T1, which is when the downwardly sloping road is entered, because neither the brake pedal nor the accelerator pedal are depressed, and the vehicle speed is equal to or greater than the lower-limit vehicle speed.

The state of charge (SOC) of a battery decreases through consumption of electrical power by onboard devices, since power cannot be generated by the MG 4 during sailing stop travel. In addition, since it is necessary to charge the battery 5 through power generation or regeneration when the battery SOC has fallen to a lower limit value, the sailing stop control must be ended. More specifically, in FIG. 2, even though it is at time T3 that the downwardly sloping road ends, the sailing stop control must be ended at time T2, which precedes time T3. Accordingly, there is less of a fuel-economy-improving effect obtained through the sailing stop control than when the sailing stop control is executed up to time T3.

Thus, in the present embodiment, the controller 9 executes the control described below in order to further increase the time over which the sailing stop control is executed.

Figure 3:
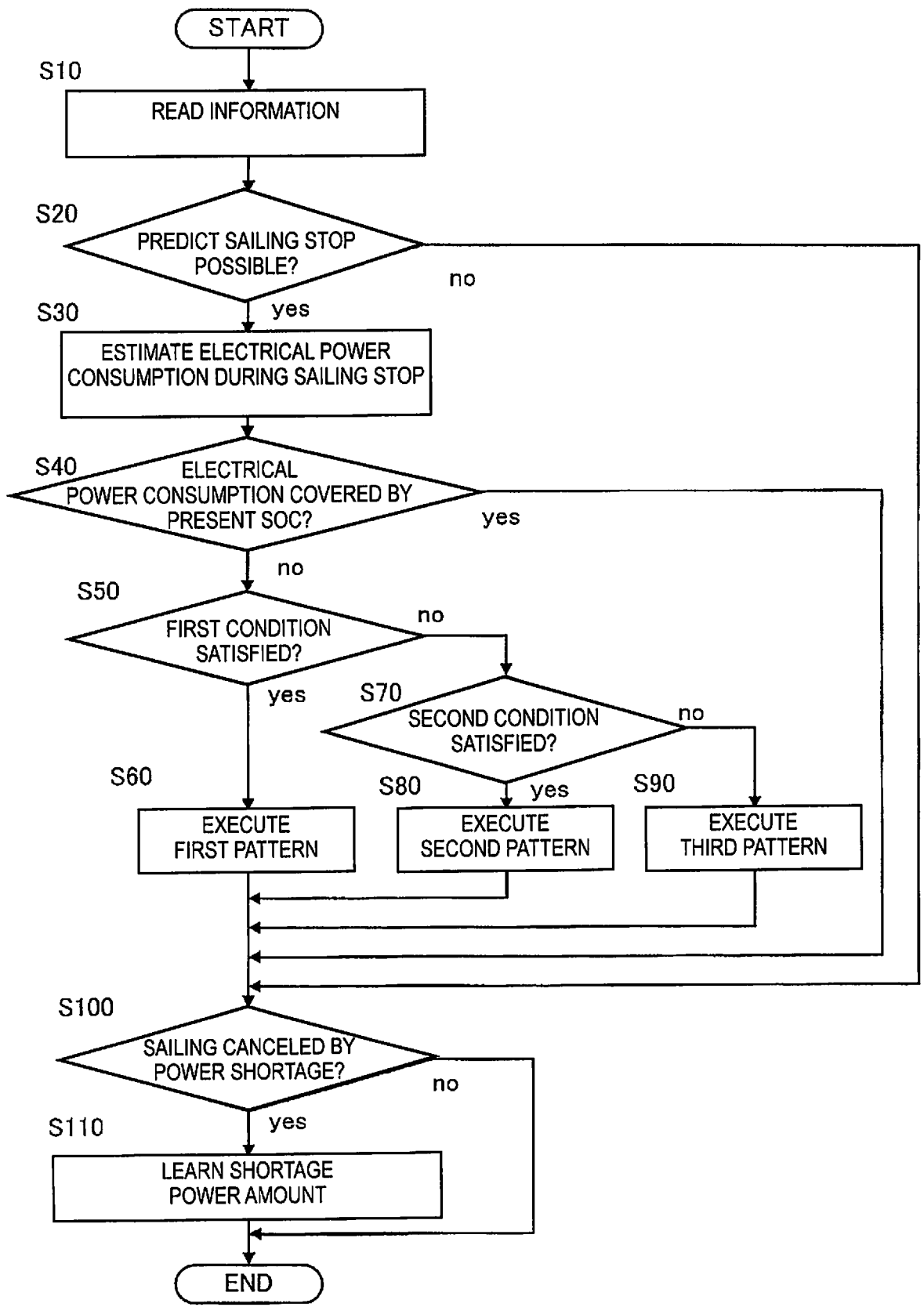
FIG. 3 is a flowchart indicating a control routine to be executed by a controller.

FIG. 3 is a flowchart indicating control routines to be executed by the controller 9. In the present control routine, when it is predicted that there is a section on a route where the sailing stop control can be executed, electrical power consumption during the sailing stop control is anticipated, and the battery 5 is charged before the sailing stop control starts. A detailed description is provided below according to steps in the flowchart.

In step S10, the controller 9 reads information relating to a status of a road on which a host vehicle is to travel; i.e., route information and map information acquired by an onboard navigation system, a travel history of the host vehicle, and information acquired through a road-to-vehicle communication and a vehicle-to-vehicle communication.

The travel history of the host vehicle includes fluctuation in a vehicle speed, an acceleration and a deceleration of the host vehicle, and history of operations such as steering, but also information such as acceleration and deceleration profiles and amount of traffic around the host vehicle, as acquired by onboard devices such as a camera and a radar.

In step S20, the controller 9 predicts, based on information acquired in step S10, whether or not there is a section on a route where the sailing stop control can be executed (also referred to as "SS-executable section" below). For example, in a case where a downwardly sloping road lies ahead, it is predicted that an SS-executable section will be present. It is also possible to predict that an SS-executable section is present when it is known from previous travel history that there is a section on the current route where the sailing stop control has been executed. Predictions can also be made in greater detail. For example, even if the vehicle has traveled over a downwardly sloping road, it is possible to predict that no SS-executable section will be present when it is obvious from the travel history that the vehicle did not travel over the downwardly sloping road at a vehicle speed equal to or greater than a lower-limit vehicle speed during the sailing stop control, or when it is known from congestion information that the downwardly sloping road is congested. Furthermore, it is possible to predict that no SS-executable section will be present when it is expected, from a status of the surroundings of the host vehicle, that the vehicle cannot travel on the downwardly sloping road at a speed equal to or greater than the lower-limit vehicle speed during the sailing stop control.

The controller 9 executes a process in step S30 when it has been predicted that an SS-executable section is present, and otherwise executes a process in step S100.

In step S30, the controller 9 calculates an estimated electrical power consumption, which is electrical power consumption of a vehicle when the sailing stop control is executed in an SS-executable section. The electrical power consumption is estimated based on, e.g., electrical power consumption of electric devices such as a navigation system, air conditioning system, and headlights, and usage conditions for electric devices assumed in SS-executable sections. Higher amounts of steering operation and brake depression in SS-executable sections as expected from information read in step S10 correspond to higher estimated electrical power consumption calculated by the controller 9.

In addition, the estimated electrical power consumption calculated when a vehicle travels through an SS-executable section under autonomous driving is greater than that when the vehicle travels under driver-enabled driving. This is because the steering operation, brake operation, etc., are performed by actuators in autonomous driving, increasing the electrical power consumption.

In step S40, an assessment is made by the controller 9 as to whether the present battery SOC can cover the estimated electrical power consumption, i.e., whether there will be a shortage in electrical power while the sailing stop control is executed. When there is a shortage in the amount of electrical power that the current battery SOC can generate relative to the amount of electrical power necessary to pass through the SS-executable section without having to charge the battery 5 by means of power generation or regeneration, the assessment made by the controller 9 is that power "cannot be covered."

The controller 9 executes a process in step S50 when assessing that power cannot be covered, and executes a process in step S100 when making an assessment that power can be covered.

Upon having assessed that power cannot be covered, the controller 9 calculates the deficiency in the amount of electrical power ("electrical power shortage") while the sailing stop control is being executed, and the battery SOC necessary to cover the power shortage.

In step S50, the controller 9 assesses whether a first condition (discussed hereunder) is established, and either executes a process in step S60 if so, or a process in step S70 if not.

The first condition is that (a) an expected SS-executable section is a downwardly sloping road, and (b) a sufficient fuel-economy-improving effect will be obtained even when the battery SOC is increased by regeneration after the downwardly sloping road has been entered, and the sailing stop control is started thereafter. The "sufficient fuel-economy-improving effect" is discussed further below.

In step S60, the controller 9 executes traveling in a first pattern. In the first travel pattern, a vehicle travels in the current state until reaching an SS-executable section, regeneration is started to charge the battery 5 once the SS-executable section is entered, and the sailing stop control is started when the battery SOC has risen enough for the estimated electrical power consumption to be covered. The effect achieved by traveling in the first pattern is discussed further below.

In step S70, which is executed when the first condition is not established, the controller 9 assesses whether or not a second condition is established, and either executes a process in step S80 if so, or a process in step S90 if not.

The second condition is that any decline in fuel economy performance caused by power generation or regeneration before entering an SS-executable section in order to compensate for the power shortage must be within a tolerance range. For example, the second condition is established if a section traveled through while power is generated is a flat road, but not established if the section traveled through while power is generated includes numerous upwardly sloping roads. The tolerance range for the level of decline in fuel economy performance shall be discussed further below.

When the second condition is established, the controller 9 executes traveling in a second pattern in step S80. In the second travel pattern, power generation or regeneration is performed before entering an SS-executable section, whereby the battery 5 is charged so that the battery SOC rises at least to a level at which the estimated electrical power consumption is covered, and the sailing stop control is started upon entering the SS-executable section. The effect obtained by traveling in the second pattern is discussed further below.

When the second condition is not established, the controller 9 executes traveling in a third pattern in step S90. In the third travel pattern, the battery 5 is not charged before an SS-executable section is entered, and the sailing stop control in the SS-executable section is disallowed. The effect obtained by traveling in the third pattern is discussed further below. The sailing idle control may be executed as an alternative to prohibiting the sailing stop control in an SS-executable section.

The controller 9 assesses whether the sailing stop control or the sailing idle control has been canceled in step S100 due to a deficiency in electrical power, and either learns the power shortage in step S110 when the assessment result is affirmative, or ends the present routine when the assessment result is negative.

"Learns the power shortage amount n step S110" refers, specifically, to learning an actual electrical power consumption and an actual amount of decrease in the battery SOC in association with the amount of traffic, and acceleration and deceleration profiles. When the subsequent iteration of calculations is made, even if the conditions are the same as in the present iteration, the estimated electrical power consumption and the amount of increase in the battery SOC are calculated so as to be larger than in the present iteration in accordance with the learning result. In other words, according to the present embodiment, the estimated electrical power consumption and the amount of increase in the battery SOC set based on the estimated electrical power consumption are set so as to decrease in relative fashion when the first iteration of calculations are made, and can be gradually increased in accordance with the learning result. This makes it possible to apply control over the battery SOC, as appropriate, prior to starting the sailing stop control. Moreover, along with an increase in the estimated electrical power consumption in the first iteration of calculations, is a corresponding increase in the amount of electrical power generated prior to entering the SS-executable section, and in the amount of fuel consumed for generating electrical power. However, according to the present embodiment, since it is possible to prevent the estimated electrical power consumption from exceeding what is necessary, it is possible to prevent the amount of fuel consumed for generating electrical power from being higher than what is necessary.

The effect obtained when the aforementioned control routines are executed shall now be described with reference to a timing chart.

Figure 4:
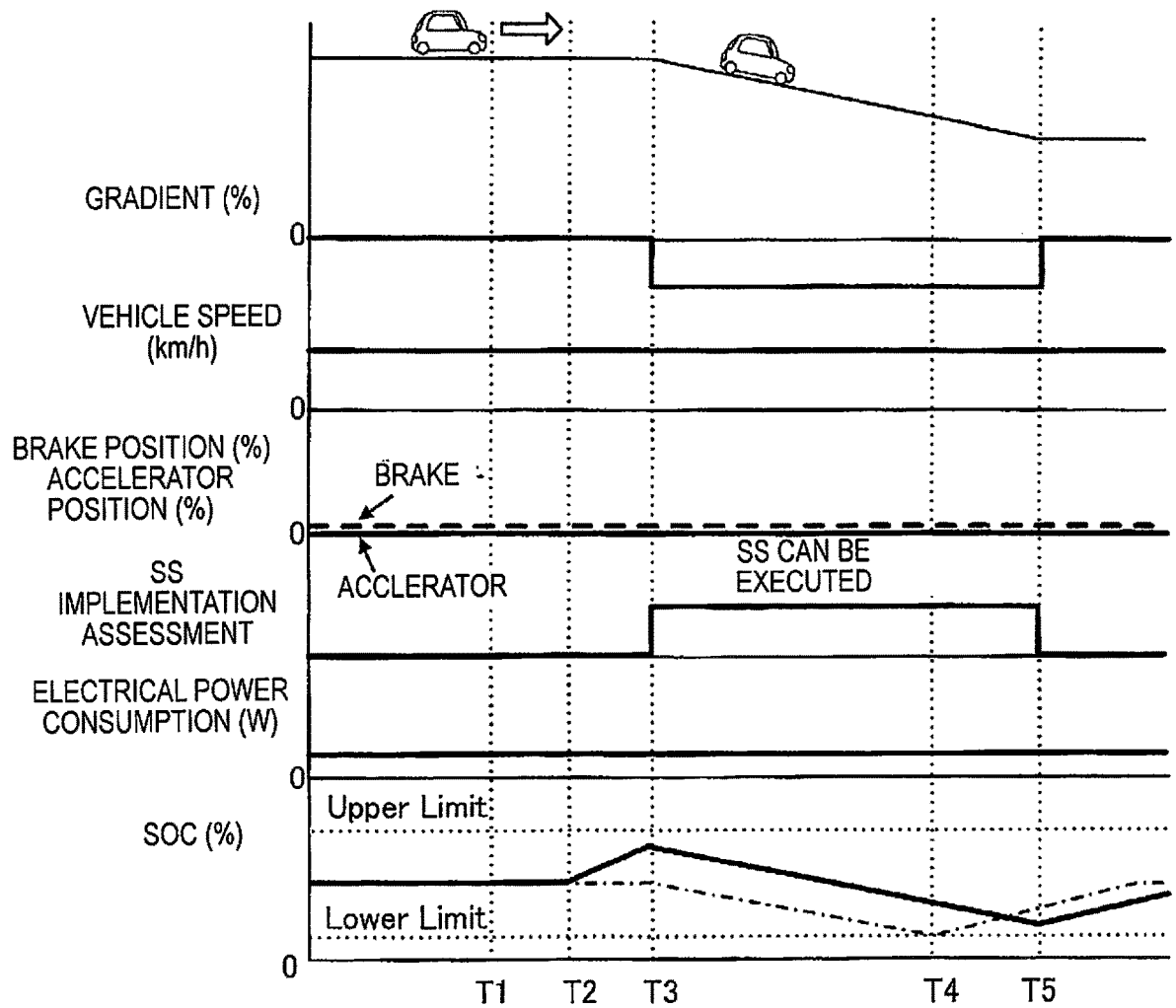
FIG. 4 is a chart for illustrating an effect achieved through control according to a second pattern of an embodiment.

FIG. 4 is a timing charge for when the second pattern shown in FIG. 3 is executed in an instance where the vehicle is driven by a driver. The solid line in the SOC charge indicates that the second pattern is being executed, and the dotted-chain line indicates that the control according to the present embodiment is not executed.

The controller 9 computes the estimated electrical power consumption upon assessing that an SS-executable section is present on a route at time T1. In order to charge the battery 5 with enough electrical power to cover the estimated electrical power consumption prior to entering the SS-executable section, charging is started at time T2. As a result, it is possible to keep the battery SOC at or above the lower-limit value until time T5, which is where the SS-executable section ends. In other words, the sailing stop control can be continued until the SS-executable section ends.

By contrast, when the present embodiment is not executed, charging is not performed prior to entering the SS-executable section. As a result, the battery SOC falls to the lower-limit value at time T4, which is partway through the SS-executable section, and in order to charge the battery 5 it will be necessary to cancel the sailing stop control and start power generation.

Accordingly, executing the present embodiment makes it possible to avert situations in which the sailing stop control needs to be interrupted in the SS-executable section, and further strengthen the fuel-economy-improving effect achieved through the sailing stop control.

Figure 5:
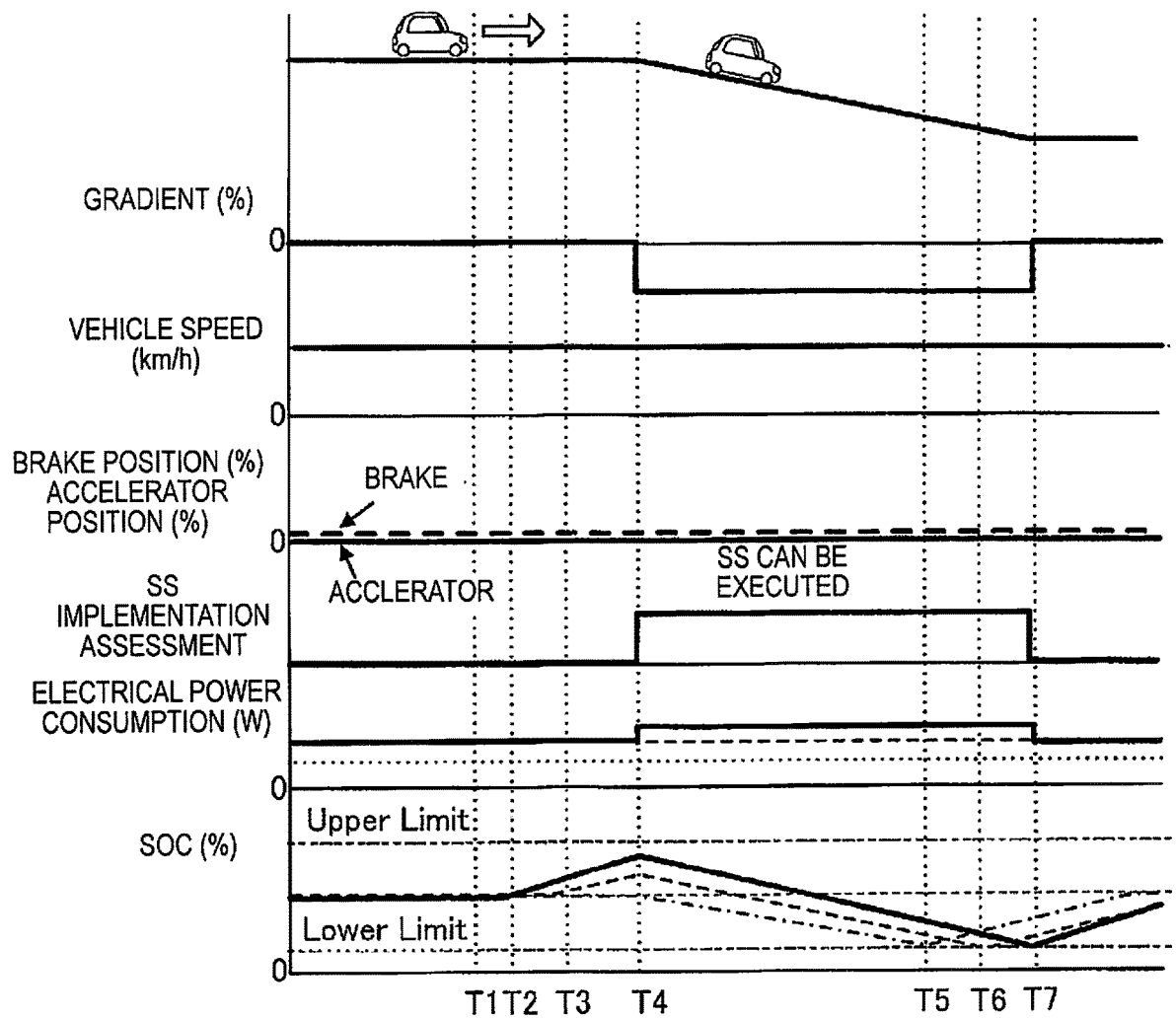
FIG. 5 is a chart for illustrating a method for calculating estimated electrical power consumption when autonomous driving is performed, and an associated effect.

FIG. 5 is a timing chart for an instance when autonomous driving is performed and the second pattern in FIG. 3 is executed. The solid line in the SOC chart shows when the second pattern has been executed, the dotted-chain line shows when the control of the present embodiment has not been executed, and the dashed line shows when electrical power consumption in the SS-executable section has been calculated in the same manner as when a driver is driving. The solid line in the electrical power consumption chart shows when the present embodiment has been executed, while the dashed line shows when electrical power consumption in the SS-executable section has been calculated in the same manner as when a driver is driving.

As has been discussed above, during autonomous driving, electrical power is consumed by steering operation, braking operation, etc.; therefore, the electrical power consumption in the SS-executable section will be greater than under driver-enabled driving. Accordingly, when the battery 5 is charged by calculating the estimated electrical power consumption in the same manner as under driver-enabled driving, the battery SOC, as shown in FIG. 5, will fall to the lower-limit value at time T6, which is partway through the SS-executable section, possibly requiring the sailing stop control to be canceled.

By contrast, when the estimated electrical power consumption in step S30 in FIG. 3 is calculated in the present embodiment, provided that autonomous driving is being performed, the controller 9 will calculate electrical power that exceeds what is used under driver-enabled driving by the amount of electrical power consumed by steering operation, etc. Accordingly, as shown in FIG. 5, the battery SOC at time T4, which is when the SS-executable section is entered, will exceed that under driver-enabled driving, and the battery SOC can be kept at or above the lower-limit value until time T7, which is when the SS-executable section ends. In other words, it is possible for the sailing stop control to continue until the SS-executable section ends. The charging-start time (time T2) will be earlier than the charging-start time under driver-enabled driving (time T3) correspondingly with respect to the increase in the amount of charge in the battery 5.

Figure 6:
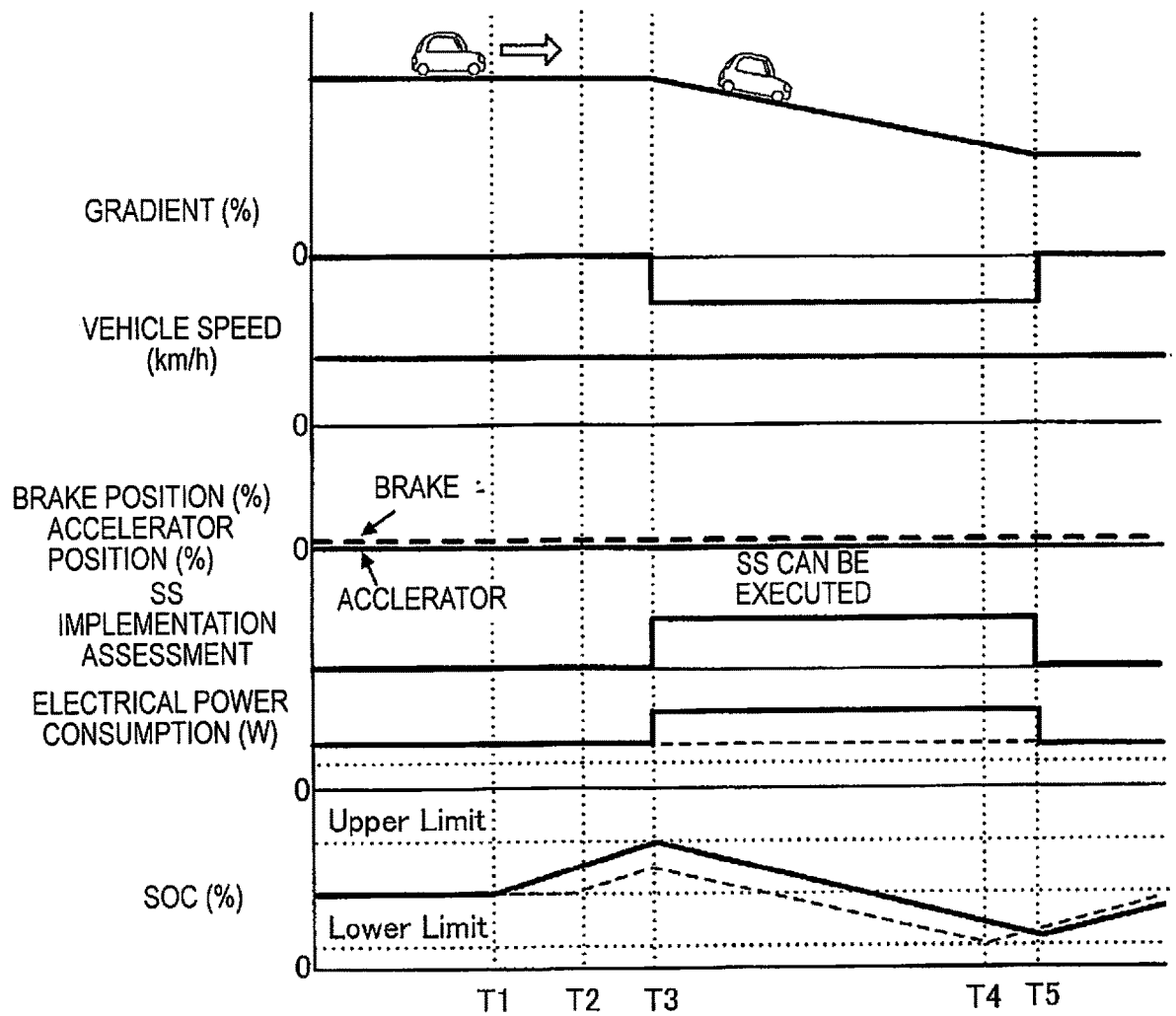
FIG. 6 is a chart for illustrating an effect obtained by learning power shortages.

FIG. 6 is a timing chart for depicting an effect of learning in step S110 in FIG. 3. The solid lines in the SOC chart and the electrical power consumption chart indicate time after learning, while the dashed lines indicate time before learning. "Before learning" includes not only when the first computation has been made in the control routine shown in FIG. 3, but instances in which, e.g., the amount of traffic and acceleration and deceleration profiles experienced on a route that has been passed over numerous times are unprecedented.

When the battery SOC is controlled based on the before-learning estimated electrical power consumption, as shown by the dashed line in FIG. 6, the battery SOC may drop to the lower-limit value at time T4, which is partway through the SS-executable section, when, inter alia, acceleration and deceleration occur more frequently than expected due, e.g., to high traffic volumes. Through learning this result, the estimated electrical power consumption for the SS-executable section will exceed the current instance in subsequent computation iterations. As a result, and as shown by the solid line in FIG. 6, the battery SOC at time T3, which is when the SS-executable section is entered, will be greater than before learning, and the battery SOC can be kept at or above the lower-limit value until time T5, which is when the SS-executable section ends. In other words, the sailing stop control can continue until the SS-executable section ends. The charging-start time (time T1) will be earlier than the charging-start time under driver-enabled driving (time T2) correspondingly with respect to the increase in the amount of charge in the battery 5.

Figure 7:
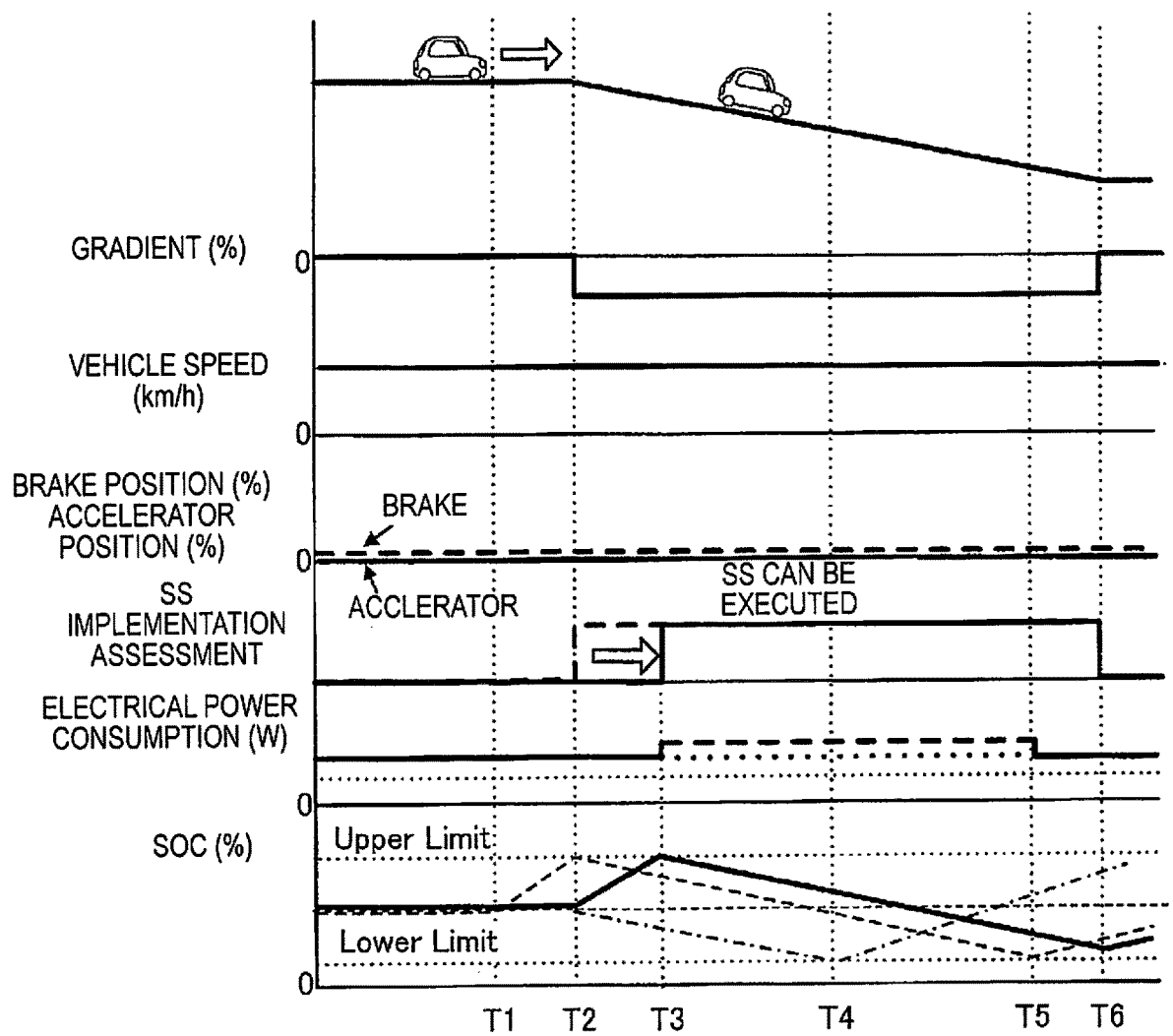
FIG. 7 is a chart for illustrating an effect obtained by control according to a first pattern of an embodiment.

FIG. 7 is a timing chart for illustrating an instance where an adequate fuel-efficiency-improving effect is obtained via the first pattern shown in FIG. 3. The solid line indicates when the first pattern has been executed, the dashed line indicates when the second pattern has been executed, and the dotted-chain line indicates when the control of the present embodiment has not been executed.

In the first pattern, the battery 5 is charged by regeneration after the SS-executable section has been entered, and the sailing stop control is started once a battery SOC that covers the estimated electrical power consumption has been reached. In the first pattern, it is impossible to execute the sailing stop control from when the SS-executable section is entered to when charging of the battery 5 ends; therefore, the fuel-efficiency-improving effect that is derived from the sailing stop control will presumably decline.

However, as shown in FIG. 7, when the second pattern has been executed, the battery SOC could end up falling to the lower-limit value at time T5, which is partway through the SS-executable section, even if the battery SOC is lifted to the upper-limit value at time T2, which is when the SS-executable section is entered. This is because, despite the electrical power consumption during the sailing stop control increasing correspondingly with respect to a lengthening of the SS-executable section, the capacity of the battery 5 is limited. In other words, when the estimated electrical power consumption exceeds the electrical power covered by having fully charged the battery 5, it is impossible in the second pattern for the sailing stop control to continue until the SS-executable section ends.

As shown in FIG. 7, when the second pattern has been executed and the sailing stop control is canceled at time T5, which is partway through the SS-executable section, power generation or regeneration is started to charge the battery 5. In other words, the sailing stop control can be continued between times T2 and T5, and power will be generated from time T5 onward regardless of whether the vehicle is in the SS-executable section.

By contrast, in the first pattern, the battery SOC reaches the upper-limit value at time T3, which is partway through the SS-executable section, whereupon the sailing stop control is started, and the battery SOC falls to the lower-limit value at time T6, which is when the SS-executable section ends. In other words, in the first pattern, the sailing stop control can be continued from time T3 to time T6.

The periods between times T2 and T5 and between times T3 and T6 are both needed for the battery SOC to drop from the upper-limit value to the lower-limit value during the sailing stop control. Accordingly, in FIG. 7, there is no difference between the first and second patterns in terms of how long the sailing stop control can be continued. In other words, there is no difference in terms of the fuel-efficiency-improving effect derived from the sailing stop control. This is an instance where "an adequate fuel-efficiency-improving effect is obtained even via the first pattern."

The length and gradient of the downwardly sloping road experienced when an adequate fuel-efficiency-improving effect is obtained are examined in advance via experimentation, etc., and stored in the controller 9. When the length and gradient are exceeded, it is determined that the first condition in step S50 in FIG. 3 has been established.

Figure 8:
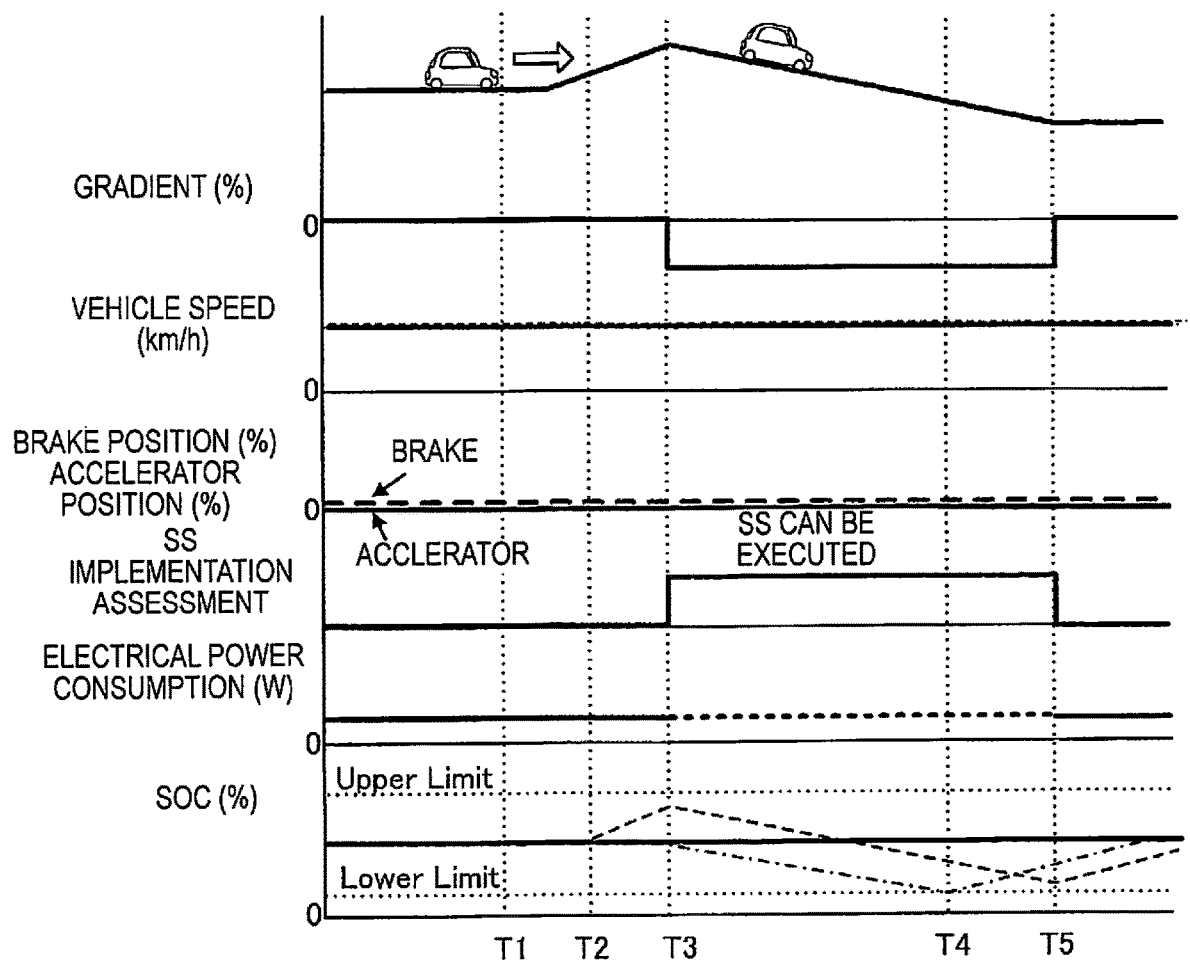
FIG. 8 is a chart for illustrating an effect obtained by control according to a third pattern of an embodiment.

FIG. 8 is a timing chart for when a third pattern is executed. The solid line indicates when the third pattern has been executed, the dashed line indicates when the second pattern has been executed, and the dotted-chain line indicates when the control of the present embodiment has not been executed.

As shown in FIG. 8, there may be instances where, after it has been predicted that an SS-executable section will be present on the route at time T1, an upwardly sloping road will also be present prior to entering the SS-executable section.

Even in such instances, executing the second pattern will allow the sailing stop control to be continued until the SS-executable section ends, as shown.

However, when the second pattern is executed, charging of the battery 5 will occur between times T2 and T3, which occur during travel over the upwardly sloping road. Charging via regeneration is difficult during travel over an upwardly sloping road, for which reason power is generated by the MG 4. Since the MG 4 is driven by the engine 1, the engine load will increase and fuel economy performance will decline when power is generated.

Generating power will result in increased engine load even on flat roads, but the subsequent fuel-efficiency-improving effect that is derived from the sailing stop control will be larger, which means that the fuel economy performance will improve overall. In other words, as long as the road prior to entering the SS-executable section is flat, any drop in fuel economy performance caused by power generation will be within a tolerance range. However, the engine load will be greater on an upwardly sloping road than on a flat road even when traveling without power being generated. Accordingly, if the engine load is increased yet further through the generating of power, then even if the fuel-efficiency-improving effect that is derived from the sailing stop control is taken into account, fuel economy performance can be lower than when the sailing stop control is not executed.

When the control according to the present embodiment is not executed; i.e., if the battery SOC is not raised before entering the SS-executable section, and the sailing stop control is executed once the SS-executable section is entered, the sailing stop control will be canceled at time T4, which is partway through the SS-executable section, as shown. Power will be generated from time T4 onward.

When the third pattern is executed, the sailing stop control in the SS-executable section is disallowed, whereby the engine 1 will continue to be driven. This makes it possible for electrical power consumption during travel through the SS-executable section to be covered through the generation of power by the MG 4; therefore, the battery SOC will not drop during travel through the SS-executable section. Moreover, the fact that the road slopes downward means that any drop in fuel consumption accompanying power generation or regeneration will be kept within a tolerance range.

Instances where the control of the present embodiment is not executed when the second pattern has been executed, and instances where the drop in fuel economy performance is greater than when the third pattern has been executed are taken to be instances in which the degree of decline in fuel consumption exceeds a tolerance range, in which case the controller 9 will execute the third pattern.

Whether or not the degree to which the fuel consumption declines exceeds the tolerance range, the following is an example of what is to be determined.

Figure 9:
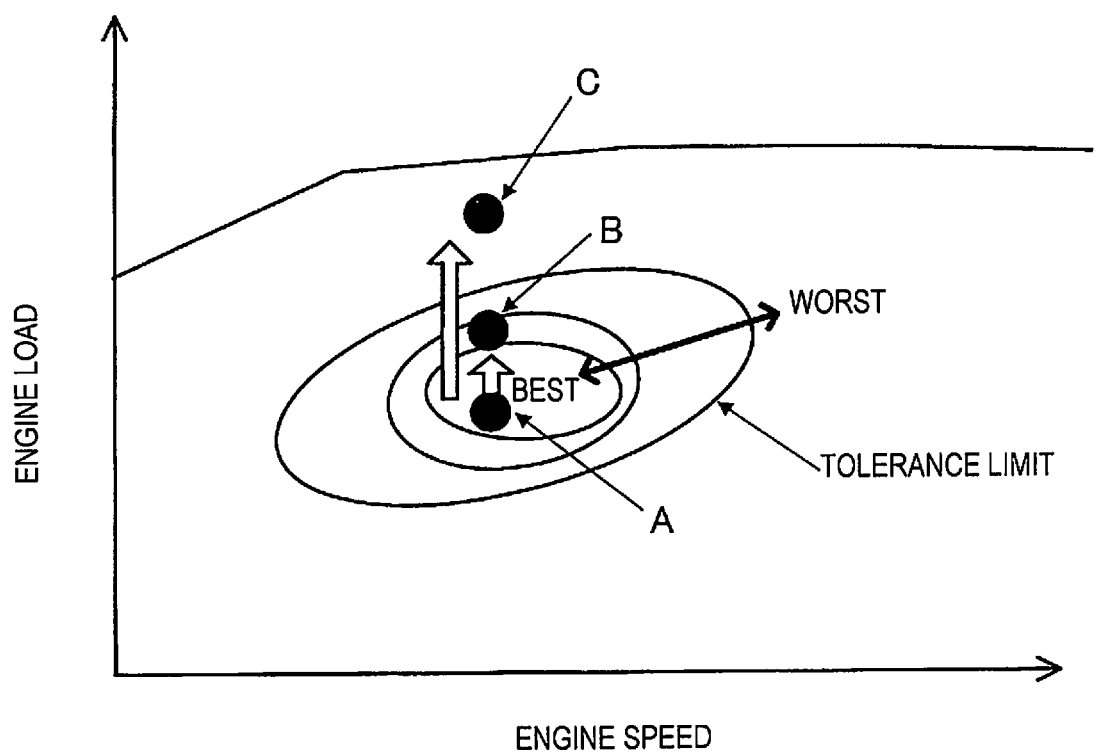
FIG. 9 is a fuel efficiency map.

FIG. 9 shows a fuel economy performance map in which engine load is shown on the vertical axis and engine speed is shown on the horizontal axis.

The ovals shown in the map are equal-fuel-consumption curves that connect driving points of equivalent fuel economy performance. As depicted, the fuel economy performance is optimal in the central region, and declines further therefrom correspondingly with respect to an increase or decrease in the engine load or engine speed.

In a map created in advance and stored in the controller 9, an equal-fuel-consumption curve for instances where the second pattern has been executed and the degree of decline in fuel consumption exceeds the tolerance range is set as a tolerance limit. Based on the information read in step S10 in FIG. 3, the controller 9 determines the degree of decline in the fuel consumption to have exceeded the tolerance range when, once the second pattern is executed, the driving point is driving point C, where the tolerance limit has been exceeded. Conversely, when the driving point for when the second pattern has been executed is driving point B, which lies within the tolerance limit, the controller 9 determines that the degree of decline in fuel consumption does not exceed the tolerance range.

The tolerance limit is set through experimentation, etc., in accordance with specifications of the vehicle to which the present embodiment is applied.

As has been discussed above, in the present embodiment, when a sailing stop condition (drive source stop condition) is established while a vehicle is traveling, the controller 9 stops the engine (drive source) 1 of the vehicle, and releases the clutch (engaging element) 3 provided between the engine 1 and the drive wheels 7 to execute the sailing stop control. The controller 9 acquires information pertaining to a status of a road upon which a host vehicle is to travel, and assesses whether an SS-executable section is present on the route based on the information. When an SS-executable section is present, the controller 9 estimates, based on the information, a power shortage amount, which is a shortage in an amount of power during the sailing stop control, and charges the battery 5 with power required to cover the power shortage prior to starting the sailing stop control.

It is thereby possible to prevent the sailing stop control from being canceled owing to a shortage in the amount of charge in the battery 5; therefore, the fuel-efficiency-improving effect that is derived from the sailing stop control can be further increased.

In the present embodiment, the information pertaining to the status of the road upon which the host vehicle is to travel contains route information and map information acquired by an onboard navigation system, travel history of the host vehicle, and information acquired through road-to-vehicle communication and vehicle-to-vehicle communication.

By using this information, the status of the road upon which a vehicle is to travel can be predicted more precisely.

In the present embodiment, the controller 9 estimates the power shortage amount as being larger when autonomous driving is performed in a section where the sailing stop control is executed than when driver-enabled driving is performed in the section.

It is thereby possible to further increase the accuracy with which the power shortage amount during the sailing stop control is estimated.

In the present embodiment, the controller 9 estimates, based on the information, the frequency and amount of operation of an operation system that includes steering or brakes in the SS-executable section, and estimates the power shortage amount to be larger correspondingly with respect to an increase in the frequency and amount of operation.

It is thereby possible to further increase the accuracy with which the power shortage amount during the sailing stop control is estimated.

In the present embodiment, when the sailing stop control has been ended in a SS-executable section due to a power shortage, the controller 9 learns an actual electrical power consumption and an actual amount of decrease in the battery SOC for the SS-executable section in association with the road status and travel history. Based on results of the learning, the controller 9 makes the subsequent amount of charge in the battery prior to starting the sailing stop control larger than a present amount.

It is thereby possible to charge the battery 5 at the start of the sailing stop control more suitably. Moreover, since there is no need to overestimate the estimated electrical power consumption before learning or in an initial learning period, it is possible to suppress the amount of fuel consumed for charging prior to starting the sailing stop control.

In the present embodiment, when a section within which the sailing stop control can be executed is a downwardly sloping road that has a gradient equal to or greater than a prescribed gradient and is of a distance equal to or greater than a prescribed distance, the controller 9 charges the battery 5 via regeneration with electrical power necessary to cover the power shortage amount after the downwardly sloping road has been entered, and starts the sailing stop control thereafter.

This raises the battery SOC through regeneration of potential energy via utilization of the downwardly sloping road while suppressing any increase in the amount of fuel consumed through generating power for the purposes of the sailing stop control. It is accordingly possible to further increase the fuel-efficiency-improving effect that is derived from the sailing stop control.

In the present embodiment, when the MG 4 is used to generate power in order to cover the power shortage amount prior to entering a SS-executable section, and the fuel economy performance has declined by at least a prescribed amount, the controller 9 disallows the generation of power for charging the battery with electrical power necessary to cover the power shortage amount. The sailing stop control is disallowed in the SS-executable section, or the sailing idle control is executed.

It is thereby possible to prevent the fuel economy performance from ending up worse due to power being generated for the purpose of executing the sailing stop control.

An embodiment of the present invention has been described above; however, the embodiment is merely a representation of some of the examples of application of the present invention, the technical scope of the invention not being limited to the specific configurations of the disclosed embodiment.

The invention claimed is:

1. A vehicle control method in which, when a drive source stop condition is established while a host vehicle is traveling, a sailing stop control is executed in which a drive source of the host vehicle is stopped, an engaging element provided between the drive source and a drive wheel is released, and the host vehicle travels under inertia, the vehicle control method comprising:

acquiring information on a status of a road on which the host vehicle will travel;

determining whether there is a section on a route where the sailing stop control can be executed based on the information that was acquired;

upon determining that the section is present where the sailing stop control can be executed, estimating a power shortage amount, which is a shortage in an amount of power required for executing the sailing stop control, based on the information such that the power shortage amount is estimated as being larger when autonomous driving is performed in the section where the sailing stop control is executed as compared to when driver-enabled driving is performed in the section; and charging a battery of the host vehicle with power required to cover the power shortage amount prior to starting the sailing stop control.

2. The vehicle control method according to claim 1, wherein the information includes route information and map information acquired by a navigation system, a travel history of the host vehicle, and other information acquired through road-to-vehicle communication or vehicle-to-vehicle communication.

3. The vehicle control method according to claim 1, further comprising estimating a frequency and an amount of operation of an operation system that includes at least one of steering or braking while in the section where the sailing stop control is executed based on the information; and the power shortage amount is estimated to be larger correspondingly with respect to an increase in the frequency and the amount of the operation.

4. The vehicle control method according to claim 1, further comprising when the sailing stop control is terminated due to a power deficiency in the section in which the sailing stop control can be executed, learning an actual electrical power consumption and an actual amount of decrease in a battery SOC for the section within which the sailing stop control can be executed is learned in association with the status of the road and travel history; and increasing a subsequent charge amount in the battery prior to starting the sailing stop control as compared to a present based on results of the learning.

5. The vehicle control method according to claim 1, wherein when the section in which the sailing stop control can be executed is a downwardly sloping road that has a gradient equal to or greater than a prescribed gradient and is of a distance equal to or greater than a prescribed distance, the battery is charged via regeneration with electrical power necessary to cover the power shortage amount after the downwardly sloping road has been entered, and the sailing stop control is started thereafter.

6. The vehicle control method according to claim 1, wherein when a generator is used to generate power in order to cover the power shortage amount prior to entering the section in which the sailing stop control can be executed, and fuel consumption is lower as compared to when the sailing stop control is not performed in the section, generation of power for charging the battery with electrical power necessary to cover the power shortage amount is disallowed, and the sailing stop control in the section in which the sailing stop control can be executed is disallowed.

7. The vehicle control method according to claim 1, wherein when a generator is used to generate power in order to cover the power shortage amount prior to entering the section in which the sailing stop control can be executed, and fuel consumption is lower as compared to when the sailing stop control is not performed in the section, generation of power for charging the battery with electrical power necessary to cover the power shortage amount is disallowed, and, in the section in which the sailing stop control can be executed, sailing idle control in which the engaging element is released without stopping the drive source and the vehicle travels under inertia is executed.

8. A control device for controlling a host vehicle, the control device comprising:

a drive source for use in travel;

an automatic transmission connected to the drive source and having a forward engaging element;

a control unit that performs a sailing stop control in which the drive source of the host vehicle is stopped, the forward engaging element is released, and the host vehicle travels under inertia upon a drive source stop condition being established while the host vehicle is traveling; and an information-acquiring unit that acquires information on a status of a road on which the host vehicle will travel, wherein the control unit is configured to:

determine whether there is a section on a route where the sailing stop control can be executed based on the information;

upon determining that the section is present where the sailing stop control can be executed, estimate a power shortage amount, which is a shortage in an amount of power required for executing the sailing stop control, based on the information such that the power shortage amount is estimated as being larger when autonomous driving is performed in the section where the sailing stop control is executed as compared to when driver-enabled driving is performed in the section; and charge a battery of the host vehicle with power required to cover the power shortage amount prior to starting the sailing stop control.

* * * * *